C. E. QUINTIN.
OIL CUP.
APPLICATION FILED MAR. 12, 1920.
1,349,098.
Patented Aug. 10, 1920.
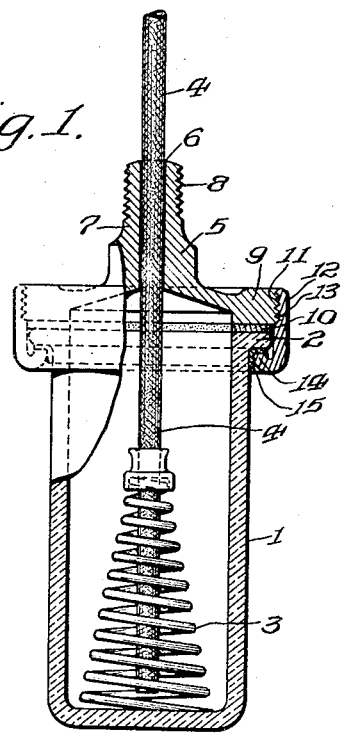
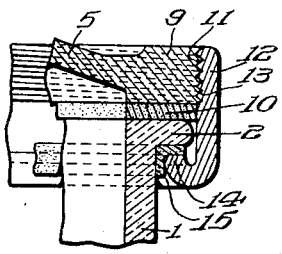
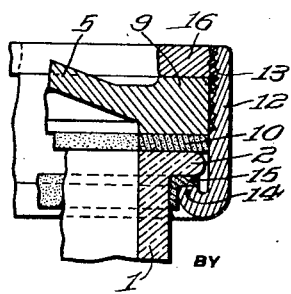
WITNESS
F. J. Hartman
INVENTOR
Clarence E. Quintin
BY H. J. Heuton
ATTORNEY

UNITED STATES PATENT OFFICE.

CLARENCE E. QUINTIN, OF GLENRIDDLE, PENNSYLVANIA, ASSIGNOR TO LEANDER W. RIDDLE, OF GLENRIDDLE, PENNSYLVANIA.

OIL-CUP.

1,349,098.  Specification of Letters Patent.  Patented Aug. 10, 1920.

Application filed March 12, 1920. Serial No. 365,146.

*To all whom it may concern:*

Be it known that I, CLARENCE E. QUINTIN, citizen of the United States, residing at Glenriddle, Delaware county, State of Pennsylvania, have invented certain new and useful Improvements in Oil-Cups, of which the following is a full, clear, and exact description, reference being had to the accompanying drawings, forming a part of this specification.

My invention relates to oil cups and is particularly adapted to the type of inverted oil cup for use with dynamos and the like, in which the oil is fed upwardly through a contained wick, and my improvements therein have for their object to provide a locking device for coupling the apertured and threaded closing cap with the oil container or body of the device especially when the latter is made of glass or other rigid and transparent or semi-transparent material.

My present invention is a carrying forward of some of the basic principles of the grease cup invented and patented to me by U. S. Letters Patent No. 1304601 dated May 27, 1919, but the grease cup of that patent must be inverted for the satisfactory feeding of oil through a wick and is otherwise not well adapted for an oil cup used, in that way, nor for lubricating a dynamo or the like in the necessarily close relation in which it must be placed relatively to the machine to be lubricated.

My present invention involves novel features in modification of the device of said prior patent to me, overcomes all the undesirable features of the latter in respect of the application of it to the aforesaid specific use in the new situation; and it consists of the combination, in its best form, in the specific example shown, of an inverted cup body or container, for the oil and wick, preferably made of glass or other rigid and transparent or semi-transparent material, closed except at its upper or inlet end and having thereat an exteriorly projecting and horizontally disposed annular flange; a removable metallic cap or closure, apertured longitudinally for the passage of the wick, and having a circumferential portion or annular flange adapted to conform in width to and overlie said horizontal flange on the cup body, and peripherally threaded, and a metallic locking ring composed of two members one of which is vertically disposed and interiorly threaded to register with the aforesaid peripheral threads on the closing cap and the other of which, at right angles to the former, is thereby adapted to be brought into horizontally parallel supporting relation to the under surface of the flange on the glass body or container, and into lifting and locking relation thereto when the threaded member of the locking ring is manipulated to fully register with the aforesaid threaded portion of the closing cap. My device comprises also the combination with said recited elements, of resilient washers of rubber or the like between certain of the elements, especially when the body or container is made of glass or the like.

In the accompanying drawings illustrating my present invention, Figure 1 is a vertical sectional view, of the complete device, showing all the parts in assembled and operative relation; Fig. 2 is a section of a detached portion thereof, showing in enlarged view the construction and illustrating the operative relation of the closing cap, the two members of the coupling ring, and the flanged opening of the body or oil container, and Fig. 3 is a modified example of the same locking principle.

Referring to said drawings, 1 indicates a cup body or container for oil which is inverted; is preferably made of glass or other rigid transparent or semi-transparent material, is entirely closed throughout except at its top, is preferably cylindrical in form and so shown, with a projecting annular flange 2 at the rim, which must be horizontally disposed. It is adapted to contain the usual wick-supporting and feeding spring 3, feeding the wick 4. The metallic closing cap, indicated generally at 5 is centrally apertured, longitudinally, as at 6, for the passage of the wick 4 therethrough, and is shown with a connecting stem 7 preferably threaded, as at 8 for readily connecting it supportingly to adjuncts of the machine to be lubricated. The closing cap is provided with an annular flange or thickened portion 9 which must be of a lateral width conforming to the length of the flange 2 of the glass cup, on which it rests, preferably through an interposed resilient washer 10, when the parts are assembled, and said flange or thickened portion 9 of the closing cap is shown exteriorly threaded, as at 11, for the purpose of coacting with an interiorly threaded locking ring, as hereinafter set forth, in respect of the example of said combination shown in the drawing. The locking ring consists of two members, one of them vertically disposed and indicated at 12, and the other of them horizontally disposed and indicated at 14, hence these two members are at right angles to each other. The vertically disposed member 12 is shown interiorly threaded at 13 to register with the exterior threads 11 on the closing cap; and the horizontal member 14 is adapted to pass under the horizontal flange 2 of the cup body, to support the same, preferably with an interposed resilient washer 15, which said member 14 is forced upwardly to lock said parts firmly together when the co-acting threads 11 and 13 on the cap and locking ring, respectively, are manually brought into operative register.

While I have shown and described and prefer, the employment of the exterior threads 11 on the periphery of the annular flange or circumferential portion of the closing cap as the means to co-act with the interiorly threaded vertical member of the locking ring, I do not wish to be limited thereto, because instead of the periphery of the cap flange carrying the co-acting threads, a separate member, in the form of an annular ring 16 provided with such interiorly disposed threads, may be substituted for such peripheral threads on the flange portion of the cap, for example as shown in Fig. 3 of the drawings, and this without departing from the structural operative principles of the invented combination described.

I claim as my invention:

1. In an oil cup, the combination of a cup body, closed throughout except at its inlet end and provided thereat with an outwardly projecting and horizontally disposed annular flange, a closing cap therefor having an annular portion, peripherally threaded, and conforming to and adapted to rest on said flange of the cup body, and a locking ring composed of two members, one of them horizontally disposed and adapted to pass under said flange of the cup body and the other of them vertically disposed and interiorly threaded, adapted thereby to register with said peripherally threaded portion of the closing cap.

2. In an oil cup, the combination of a cup body closed throughout except at its inlet end and having thereat an exteriorly projecting and horizontally disposed annular flange, a closing cap having an annular portion conforming to and adapted to rest on said flange of the cup body, and a locking ring composed of two members at right angles to each other, one of them a horizontally-disposed member adapted to pass under said flange of the cup body and the other of them a vertically disposed member interiorly threaded, and means peripherally threaded adapted thereby to register with said last mentioned threaded member of the locking ring and operating to hold said closing cap in locked relation to the locking ring and cup body.

3. An oil cup comprising in combination an inverted cup body of glass having an exteriorly projecting and horizontally disposed annular flange, a centrally apertured closing cap having an annular portion operatively resting on said flange, and a locking ring consisting of a horizontally disposed member adapted to be passed under said flange on the cup body and a vertically disposed member, said last mentioned member and the closing cap having an interposed and operatively registering screw threaded connection, operating to hold cup body and closing cap in locked relation when the elements are assembled.

4. In an oil cup, the combination of a cup body of rigid and transparent or semi-transparent material, such as glass closed throughout except at its inlet end and provided thereat with an outwardly projecting and horizontally disposed annular flange, a closing cap therefor having an annular portion, peripherally threaded, and conforming to and adapted to rest on said horizontal flange of the cup body, and a locking ring composed of two members, one of them horizontally disposed and adapted to pass under said flange of the cup body and the other of them vertically disposed and interiorly threaded, adapted thereby to register with said peripherally threaded annular portion of the closing cap, and resilient washers interposed between the cup body and the metallic parts of said elements coacting therewith when the same are brought into coincidence in operative assembled relation.

In testimony whereof I have hereunto affixed my signature this 11th day of March, A. D. 1920.

CLARENCE E. QUINTIN.

Witnesses:
I. M. TUNIS,
ALEXANDER PARK.